Jan. 5, 1954  R. R. AKEY  2,664,579
COLD HEADER
Filed Oct. 8, 1948  9 Sheets-Sheet 2

Inventor
Robert R. Akey

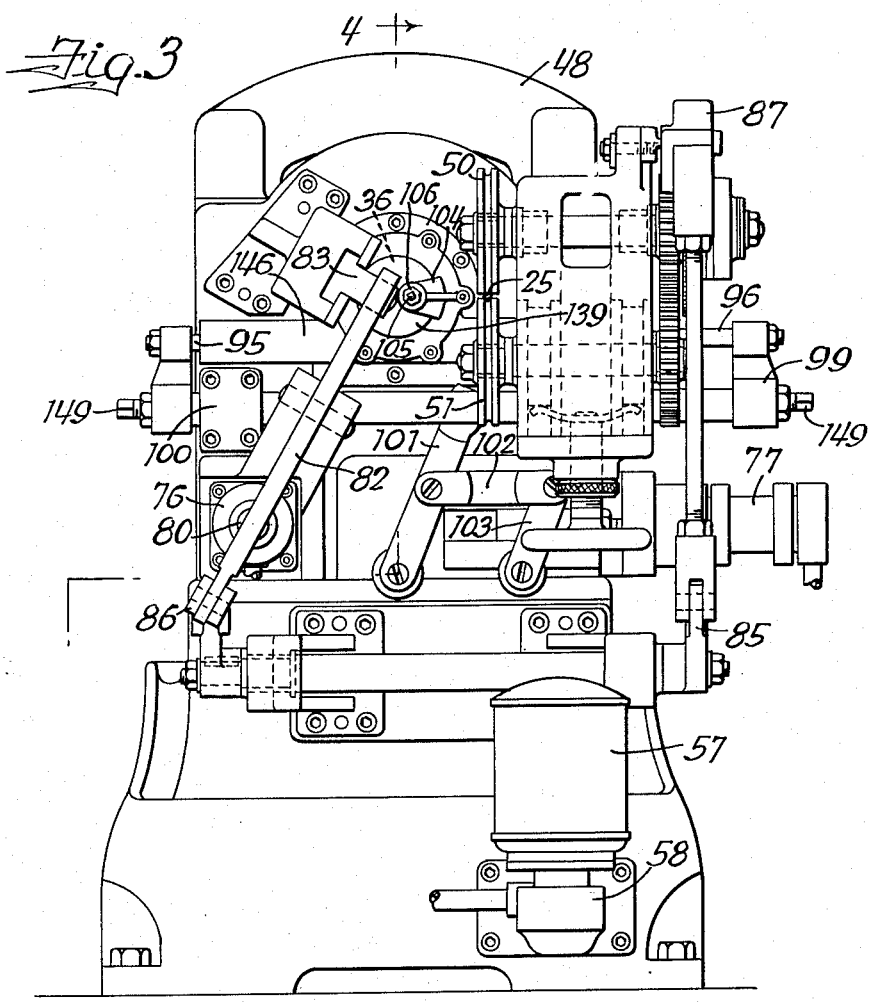
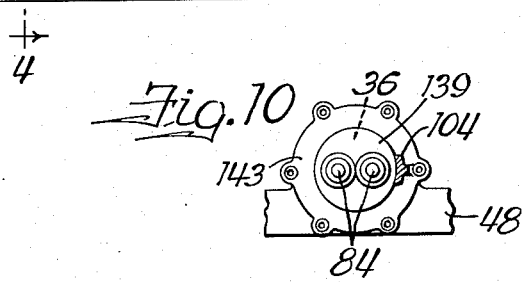

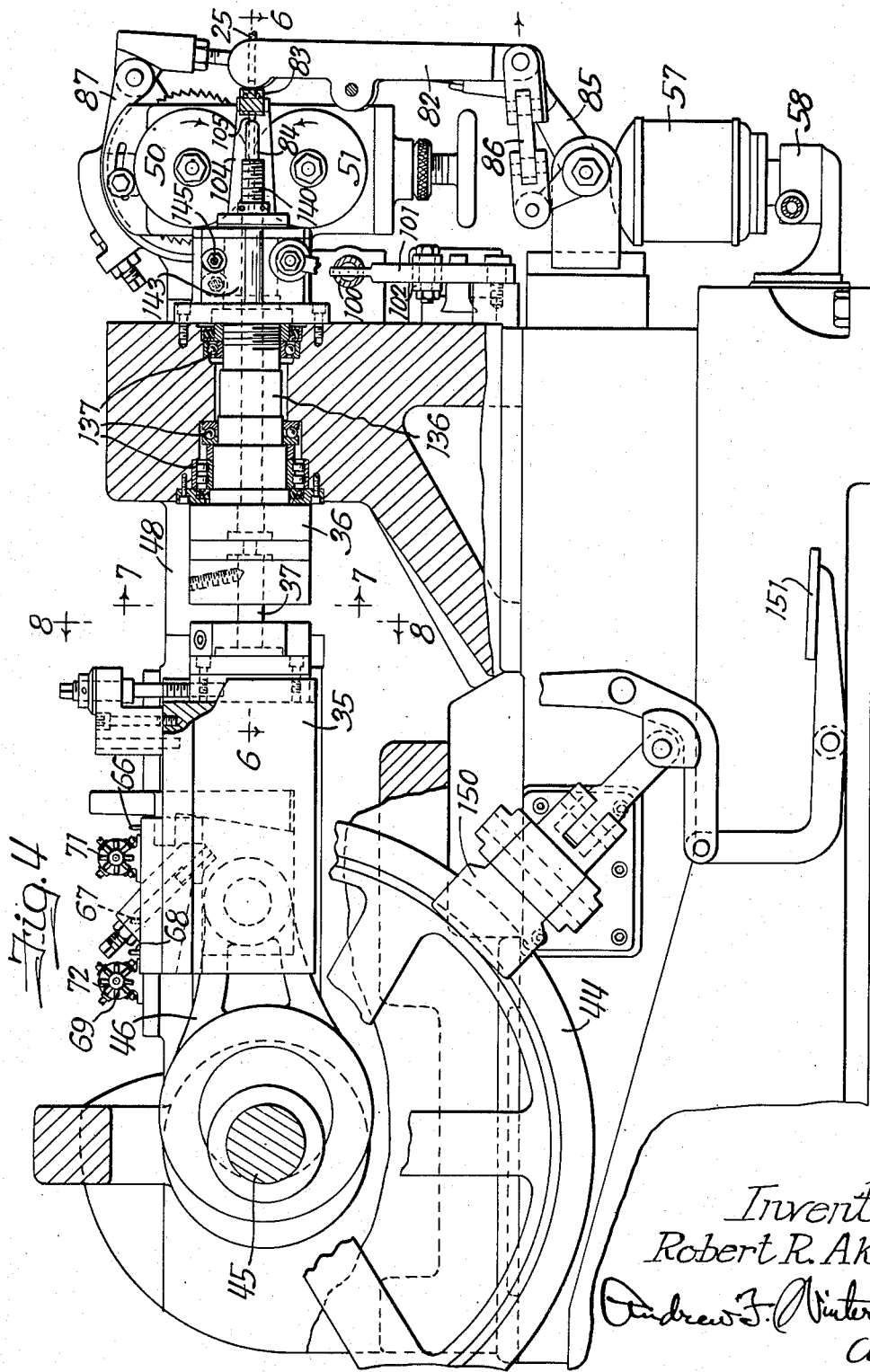

Jan. 5, 1954  R. R. AKEY  2,664,579
COLD HEADER
Filed Oct. 8, 1948  9 Sheets-Sheet 5
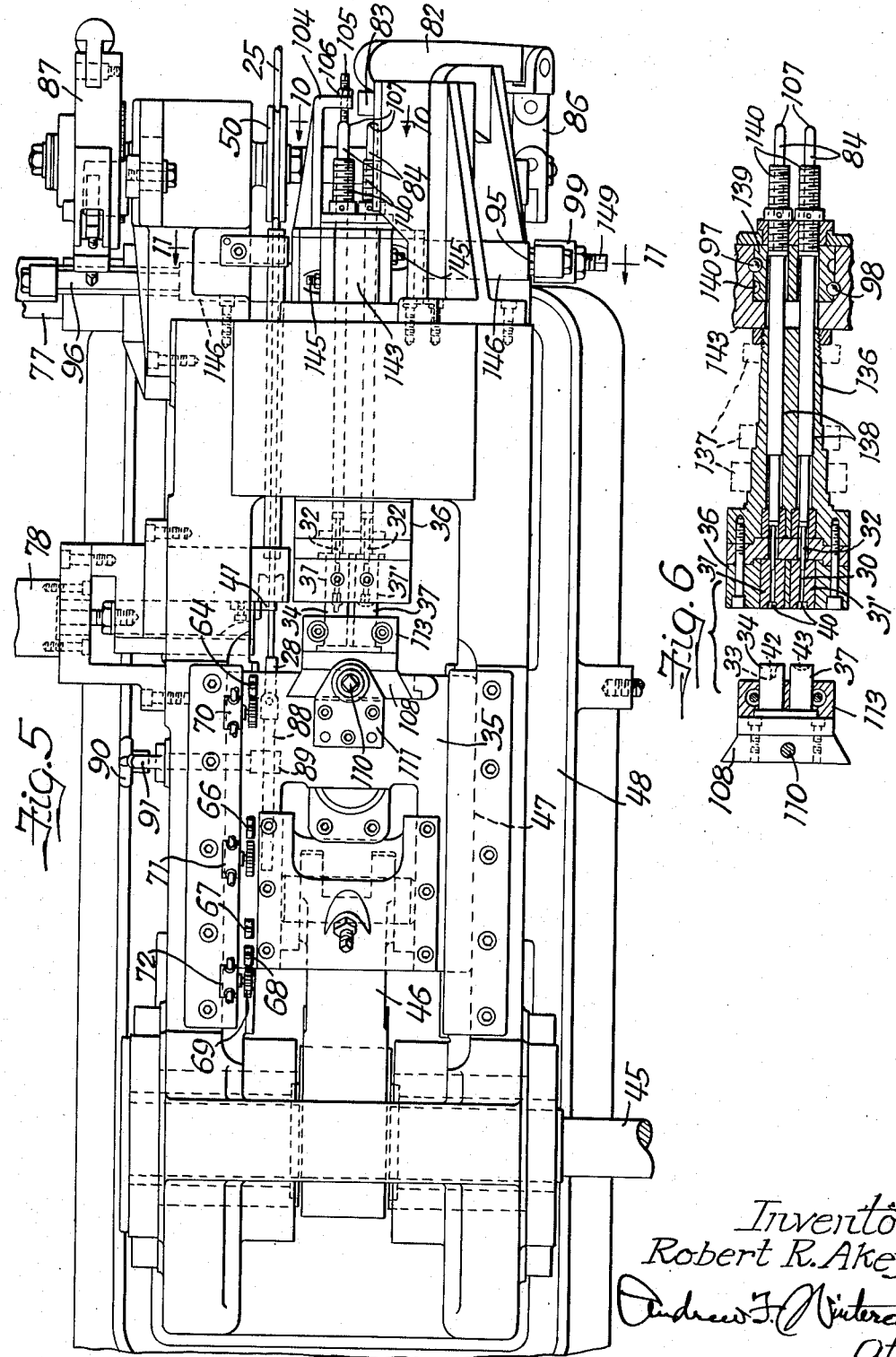
Inventor
Robert R. Akey Jan. 5, 1954    R. R. AKEY    2,664,579
COLD HEADER
Filed Oct. 8, 1948    9 Sheets-Sheet 7
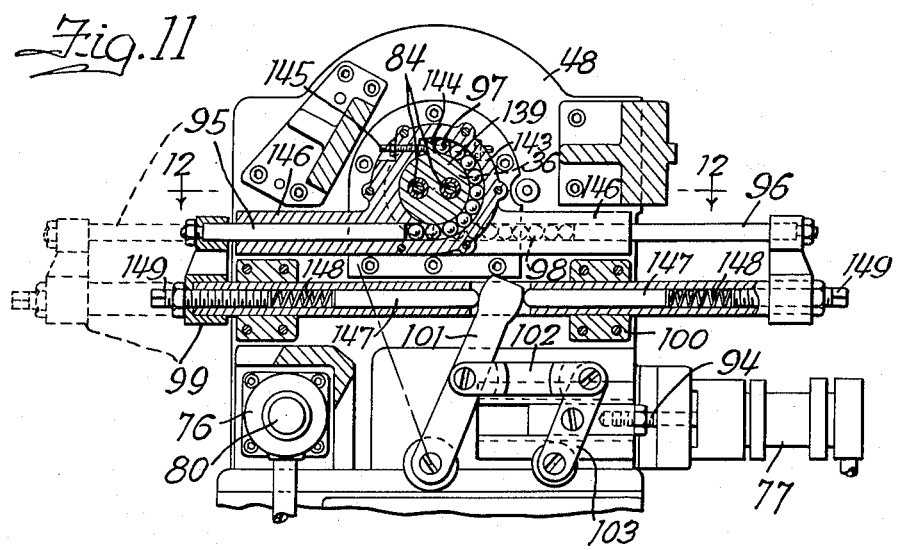
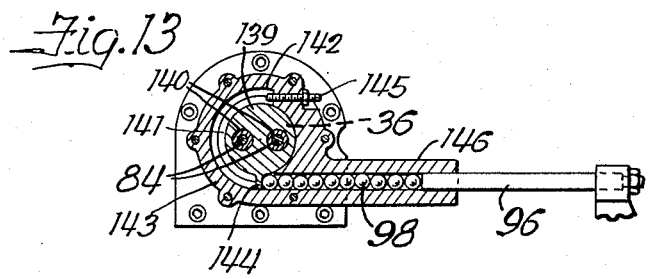
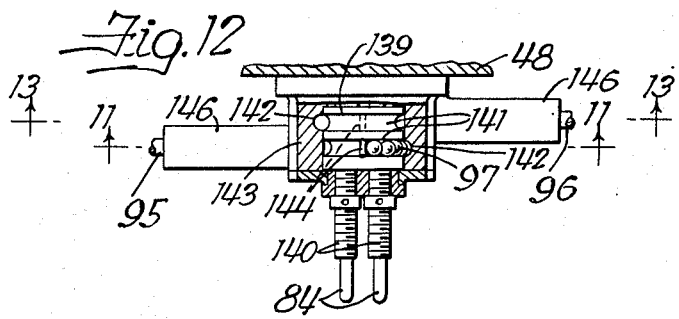
Inventor
Robert R. Akey
Andrew F. Wintercorn
atty.

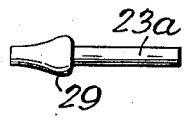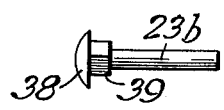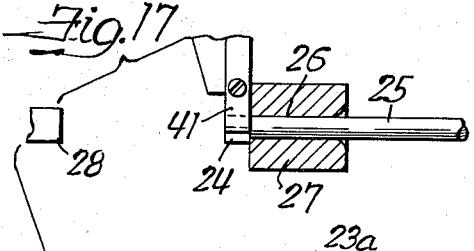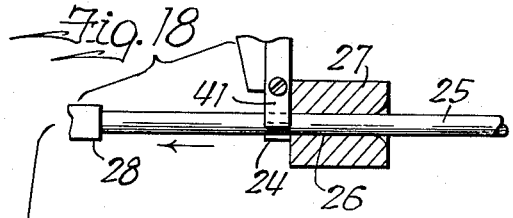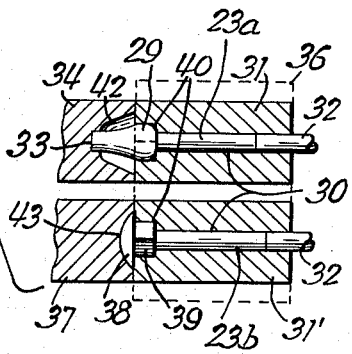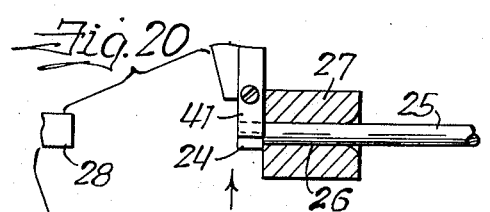

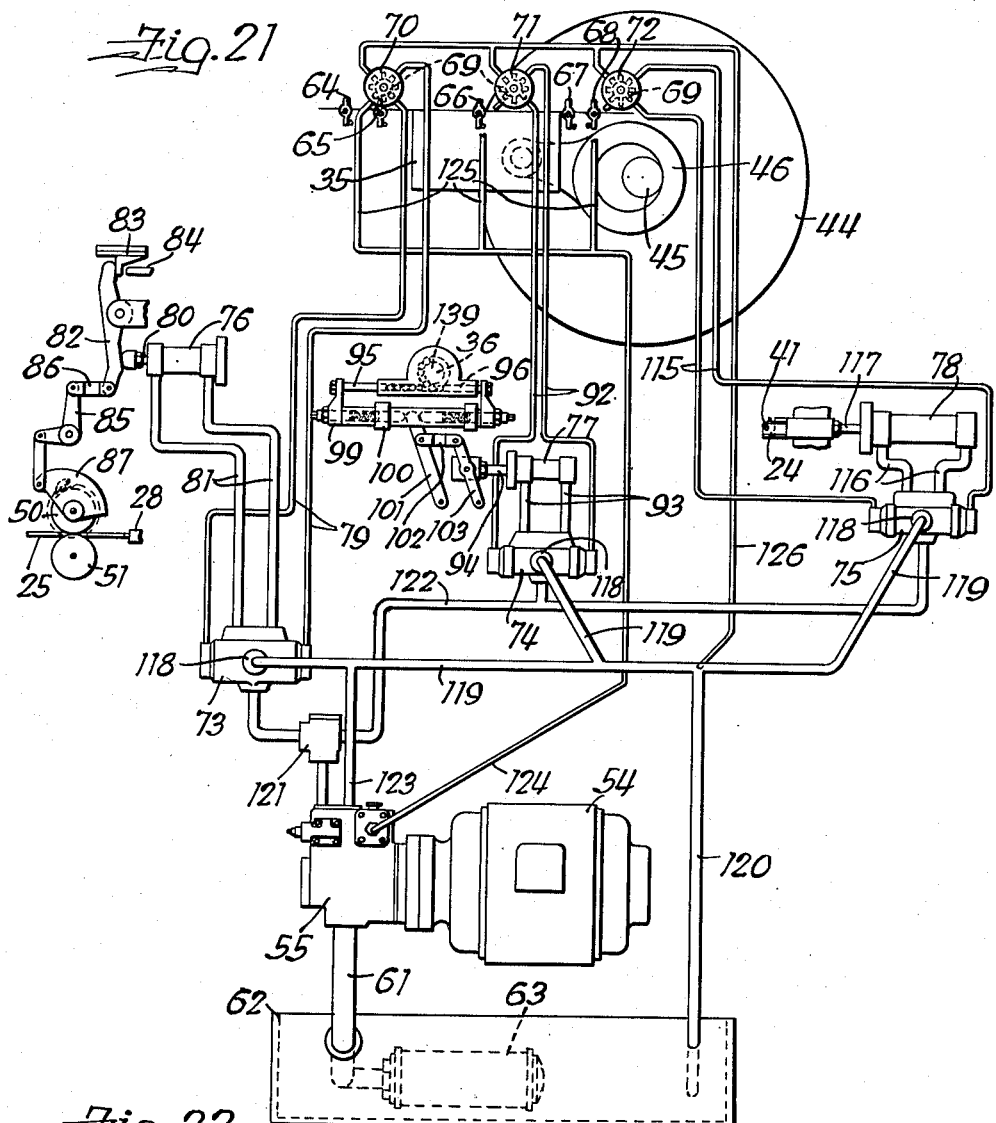
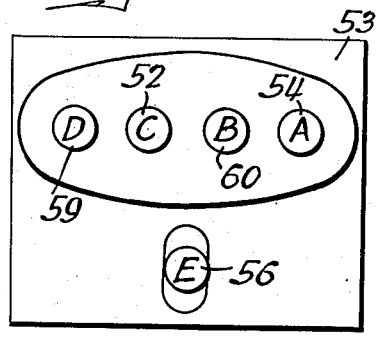

Patented Jan. 5, 1954

2,664,579

UNITED STATES PATENT OFFICE 2,664,579

COLD HEADER

Robert R. Akey, Rockford, Ill., assignor to Joseph Behr & Sons, Inc., Rockford, Ill., a corporation of Illinois Application October 8, 1948, Serial No. 53,461

1 Claim. (Cl. 10—13)

This invention relates to headers or upsetting machines.

In such machines it is common practice intermittently to feed the stock, such as a wire or rod, into the machine and cut off blanks therefrom, which are transferred to appropriate tools, where, after two or more operations are performed thereon, the headed or upset blanks are ejected.

Headers as heretofore designed and constructed were capable of producing a completed rivet or bolt with every two revolutions of the flywheel. It is the principal object of my invention to provide a header so designed and constructed that a completed rivet or bolt is obtained upon each revolution of the flywheel, which means a one hundred per cent step-up in production.

Another object is to provide a header in which the die head shifts 180° in one direction in one cycle, and is turned back 180° in the next cycle, and has two openings with identical square recesses in the outer ends thereof, the blank to be upset being entered in the one hole and partially upset, and in the same stroke the previously partially upset blank in the other hole is upset to its final form, providing a head with a square shank under it or any other desired shape, the previously partially upset portion furnishing the bulk of the metal necessary for the square or other shaped shank portion under the head. In connection with the reversible die head there are plungers and back-up pins working in the holes in the die head and arranged to cooperate alternately with a back-up screw to provide proper backing up for the blank in the initial upsetting operation, to predetermine the extent to which the plunger will be permitted to recede in the final upsetting operation, as required for the proper forming of the square or other shaped shank under the head. The machine of my invention is so designed that this receding feature is built in at very little added cost, whereas with other headers of other designs it has always been necessary to provide a special receding attachment, costing in the neighborhood of $1500.00. Moreover, with my improved method of upsetting square-shanked rivets and bolts in two steps, I obtain a much higher grade product, because I have found that there is better continuity of grain between the head and the upset square shank and between the upset shank and the plain shank than has been obtained with other methods, it being well known to what extent the heads on rivets produced on certain headers had a tendency to fracture even though to all outward appearances the rivets seemed to be satisfactory.

In the machine of my invention, the 180° shiftable die head is turned in bearings on the frame instead of on the ram, thereby enabling running at higher speed without too much vibration, and, in accordance with my invention, plungers working in guides in the frame and operated under hydraulic pressure transmit the back and forth oscillatory movement to the die head through two series of balls traveling in raceways provided therefor in the bearing for the shifting drum, accurate positioning of the die head at opposite extremes of movement being assured by the provision of manually adjustable set screws with which radial projections on the shifting drum come into abutment when the die head has been turned as far as it should go, the balls giving positive movement with minimum fraction losses in a relatively simple and economical construction and without danger of any breakage in the event of a jam, because if a jam occurs, pressure merely builds up in the fluid line extending to the operating cylinder, causing a relief valve to be opened for return of fluid to the sump.

The invention is illustrated in the accompanying drawings, in which—

Figs. 2 and 3 are end views of the machine taken from opposite ends;

Fig. 4 is a longitudinal section through the machine taken on the broken line 4—4 of Fig. 3;

Fig. 5 is a plan view of Fig. 4;

Fig. 6 is a horizontal section through the dies taken on the line 6—6 of Fig. 4;

Fig. 10 is a sectional detail on the line 10—10 of Fig. 5, looking at the rear end of the back-up pins in the 180° shiftable die head;

Fig. 11 is a section on the line 11—11 of Figs. 5 and 12, showing the novel shifting mechanism for the reversible die head;

Fig. 12 is a horizontal section on the line 12—12 of Fig. 11;

Fig. 13 is a section similar to a portion of Fig. 11, taken on the line 13—13 of Fig. 12, showing the other set of balls in elevation that appear in dotted lines in Fig. 11;

Figure 1:
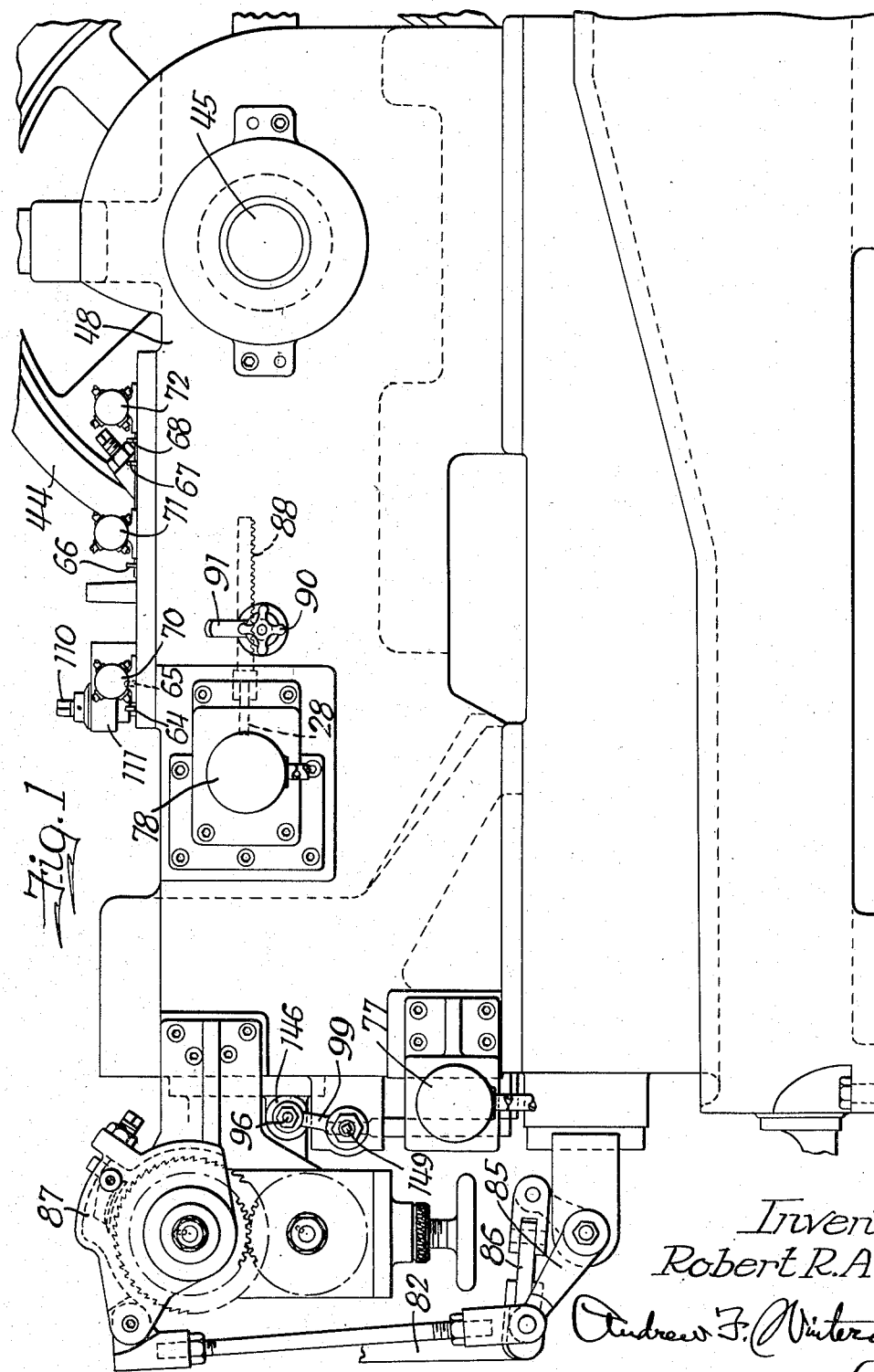
Fig. 1 is a side view of a header made in accordance with my invention, portions of the machine being broken away to enable showing the machine on a larger scale.

Figs. 14, 15, and 16 show the three stages in the production of a completed rivet or bolt, the blank being shown in Fig. 14, the same blank partially upset being shown in Fig. 15, and the finished product in Fig. 16;

Figs. 17 to 20 are more or less diagrammatic views showing the operation of the dies throughout two complete cycles of the machine;

Fig. 21 is a hydraulic circuit diagram, and

Fig. 22 is a view of the control panel for the machine.

The same reference numerals are applied to corresponding parts throughout the views.

Figure 2:
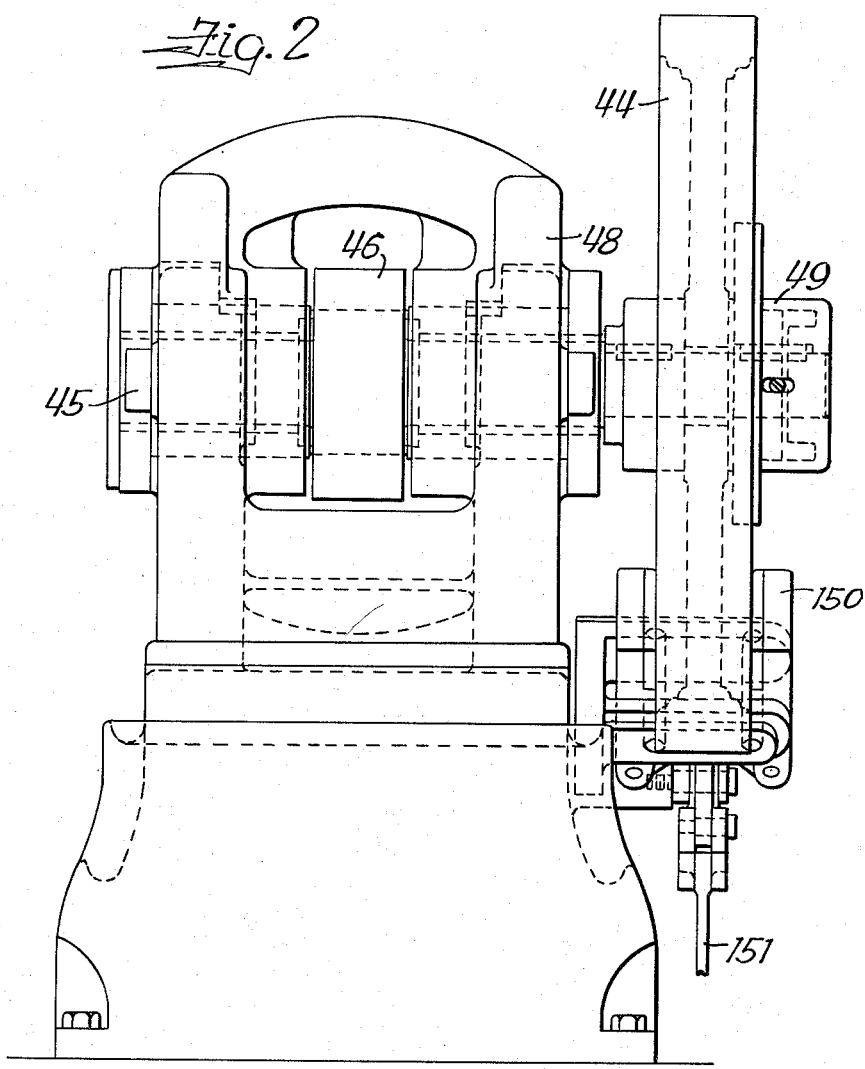
Figure 7:
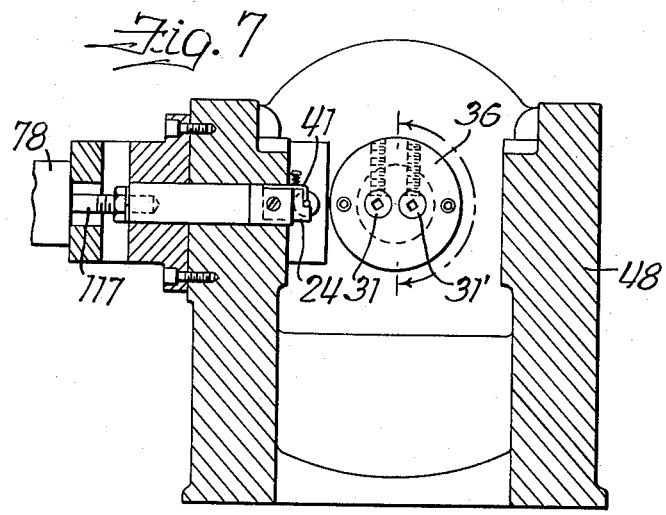
Figs. 7 and 8 are cross-sections taken on the correspondingly numbered lines of Fig. 4, looking in opposite directions.

Referring first briefly to Figs. 14 to 20, the reference numeral 23 designates a blank cut by the cut-off knife 24 from the wire stock 25 fed through the hole 26 in the cut-off die 27, after the stock has been fed far enough to engage the stop 28 to insure the correct length of blank. See Figs. 18 and 19. Fig. 18 shows the cut-off knife 24 in the cut-off position. Fig. 19, in full lines, shows the cut-off knife 24 advanced from the cut-off position, that is indicated in dotted lines, to the inserting position. Fig. 20 shows the dies closed in the first upsetting operation, the cut-off knife 24 having been previously retracted to the cut-off position adjacent the cut-off die 27, as it appears in this view. In the first upsetting operation, a conical or pear-shaped head is formed on the end of the blank, as illustrated at 29 in Fig. 15 on the intermediate form of blank 23a, the blank 23 being entered in hole 30 in die 31 in this operation backed up by a pin 32 in the manner shown in Figs. 17 and 20, while the outer end is received in a pilot recess 33 in the coning punch 34, which moves, as will soon appear, with the ram 35 (Fig. 4) toward and away from the die head 36 that carries the die 31 and another identical die 31' in spaced parallel relation and is shiftable on its longitudinal axis through 180° so that the die 31 cooperates with punch 34 in one cycle, and the die 31' cooperates with punch 34 in the next cycle. The ram carries a finishing punch 37 in spaced parallel relation to the punch 34 to cooperate with whichever of the two dies 31 and 31' is aligned therewith to perform the final upsetting operation producing the conventional flat bottomed rounded head 38 with a square, or other shaped, shank portion 39 under it, depending upon the shape of the recesses 40 in the outer ends of the holes 39 in dies 31 and 31'. See the finally formed blank 23b illustrated in Fig. 16. The reversal of the dies 31 and 31' in relation to the punches 34 and 37 is clearly illustrated by comparison of Figs. 18 and 19, Fig. 18 showing the ejection of a completed rivet or bolt 23b from die 31', and Fig. 19 showing the dies reversed so that die 31' is aligned with punch 34, ready to receive a blank 23 for its initial upsetting operation, the previously initially upset blank 23a in die 31 being at the same time aligned with punch 37 for its final upsetting operation. The conclusion of these two upsetting operations is shown in Fig. 20. The cut-off knife 24 has the usual spring clip 41 thereon, which serves to grip the blank releasably by its end portion and transfer it, as shown in Fig. 19, from the cut-off die 27 to whichever of the dies 31 and 31' is nearest the die 27 in a given cycle. The bell-shaped recess 42 in punch 34 gives ample clearance for the end portion of the blank, so that there is nothing to interfere with the bulging-out of the metal to form the conical or pear-shaped head 29 on the intermediate form of blank 23a, shown in Fig. 15, as illustrated in Figs. 17 and 20, the bulging-out at 29 occurring mainly in the recess 40 of whichever of the dies 31 and 31' is aligned with punch 34. The punch 37, on the other hand, has a spheroidal-shaped recess 43, which cooperates with whichever recess 40 is aligned therewith to form the head 38 and shank 39 in the upsetting of the intermediate form of head 29, and special attention is called to the fact that in this final upsetting operation, the blank is allowed to recede, pin 32 being free to back up in whichever die 31 and 31' is aligned with punch 37 for the final upsetting operation. In that way I insure a sharply defined head 38 and shank 39, and, incidentally, also I believe that because the metal is allowed to flow from the recess 40 into the hole 30 in this final upsetting operation, a better continuity of grain between the shank and head of the final rivet or bolt produced is obtained, which accounts for the fact that there is far less tendency for the heads to fracture off when the bolt or rivet is later used. The extent to which the blank recedes in the final upsetting operation is clearly illustrated in Figs. 17 and 20. It is also important to note that with each reciprocation of the punches 34 and 37 a finished bolt or rivet 23b is produced—in other words, one per revolution of the flywheel 44 and crankshaft 45, as compared with one for every two revolutions heretofore, which means one hundred per cent (100%) step-up in production. The crankshaft 45 is connected with the ram 35 by means of a connecting rod 46, and the ram 35 operates in suitable guides 47 provided therefor in the frame 48. As previously mentioned, the ram 35 is the only working part of the present header that is not operated hydraulically, the reason being that positiveness of movement or stroke length is essential in upsetting, because of differences in hardness of different batches of wire stock 25 used. However, a friction drive mechanism is provided at 49 (Fig. 2) between the flywheel 44 and crankshaft 45, which, in the event of a severe jam occurring in the machine, will allow slippage, thereby supplementing the safety features provided in this machine by virtue of the hydraulic circuits, as mentioned above and as hereinafter described.

Referring next to Fig. 21, and incidentally to the other Figures 1 to 13 for identification of the various parts as assembled parts of the machine, it is believed that the construction and mode of operation of the machine can be best understood by reference mainly to the hydraulic diagram, Fig. 21. A coil of wire stock 25 is placed on a rack at one end of the machine, and the end of the wire is started through the wire feeding rolls 50 and 51. Then the button 52 on the control panel, indicated diagrammatically at 53 in Fig. 22, is pressed, starting the electric motor 54 which drives the double pump 55, so as to force oil through the different valves actuated by pilot valves to cause certain cylinder actions to perform the various operations named for cutting off, transferring, and ejecting blanks. Then button 59 is pressed, to start the machine drive motor (not shown), which has a variable speed belt and pulley connection with the flywheel 44, so as to transmit drive to the crankshaft 45 through the friction drive mechanism 49. Next the button 56 is pressed, to start the motor 57 for the lubricating pump 58 (Figs. 3 and 4). The other two buttons 59 and 60 on the control panel 53 are used in stopping the machine, the button 59 being pressed to stop the motor 54, after which button 60 is pressed to stop the machine drive motor driving flywheel 44, and, finally, button 56 is pressed to stop the motor 57 driving the lubricating pump 58. The pump 55 has its suction pipe 61 communicating with a suitable sump, indicated diagrammatically at 62, through a strainer 63. Assuming buttons 52, 54, and 56 have been pressed, in the order named, to start the various motors mentioned, so that pump 55 is operating to supply oil under pressure, and the machine is driven by the flywheel 44, and lubricated by the pump 58, the following sequence occurs:

(1) The ram 35 carries dogs 64 to 68, which are arranged to engage and turn segments 69 to actuate pilot valves 70, 71, and 72, and, in turn, operate main control valves 73, 74, and 75, which control the delivery of the oil, or other fluid, under pressure from pump 55 to the cylinders 76, 77, and 78, respectively. The ram 35, it must be understood, has traveled to its forward limit and is now starting back for the commencement of another cycle, a complete cycle being 360°, or one complete revolution of the flywheel 44. All operations referred to hereinafter will be expressed in terms of degrees of annular travel of the flywheel.

(2) At the 15° position of the flywheel, turning in a clockwise direction, dog 65 operates pilot valve 70, and thereby energizes main control valve 73 with which it is connected by the lines, indicated at 79, whereby to operate the piston 80 working in cylinder 76, the valve 73 being connected, as at 81, with the cylinder 76. Piston 80 in its forward movement oscillates the rocker arm 82, so as to move the slide 83 and, accordingly, move pin or plunger 84 forwardly, and thereby move the related pin 32 forwardly also to eject the previously completed blank 23b, as in Fig. 18. In this same operation a bell-crank lever 85 is oscillated with the rocker arm 82 by virtue of the link connection 86 to advance the feed rolls 50 and 51 through the pawl and ratchet mechanism, indicated at 87, whereby to feed wire 25 forwardly to the cut-off position, as in Fig. 18, abutting the adjustable stop 28. The latter has a rack 88 attached thereto, which meshes with a pinion 89, that can be turned by hand by means of the knob 90 and locked in adjusted position by the tightening of the hand nut 91, as is believed to be clear in Figs. 1, 5, and 8. Dog 65 is pivoted on ram 35 and urged upwardly to operative position under light spring pressure, so as to be operative only in the rearward movement of the ram, the dog being deflected by the star wheel on valve 70 in the return movement of the ram so as to pass idly under it in that direction. If necessary, the star wheel on this valve may be provided with a ratchet wheel and pawl to prevent any reverse rotation.

Figure 8:
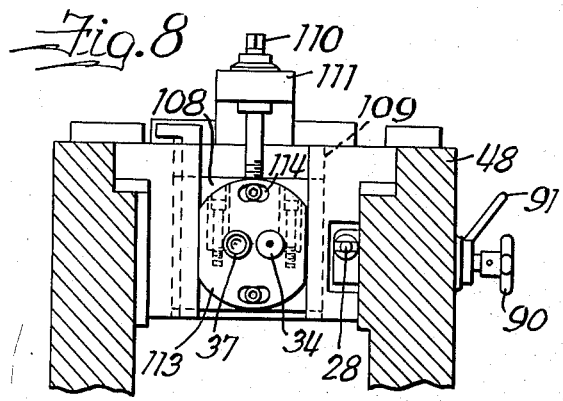
Figure 9:
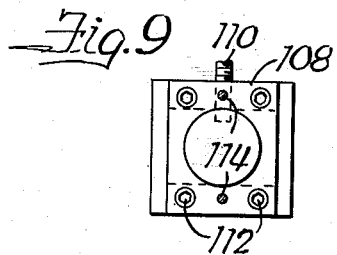
Fig. 9 is a face view of the vertically adjustable base block for the dies on the ram.

(3) As the ram 35 moves farther, to a 60° position of the flywheel 44, the next dog 64 operates pilot valve 70, to reverse the operation of main control valve 73 and return the piston 80 in cylinder 76 to a retracted position. At the same 60° position of the flywheel 44, dog 66 operates pilot valve 71, causing main control valve 74 to be operated by virtue of the pipe connections 92 provided between these two valves, whereupon fluid under pressure is delivered from valve 74 to cylinder 77 by virtue of the pipe connections 93 between the valve 74 and cylinder 77, whereby to operate the piston 94 in said cylinder and, accordingly, shift the die head 36 through 180° by means of plungers 95 and 96 and columns of bearing balls 97 and 98, as hereinafter more fully described, the plungers reciprocating with the frame 99 relative to guides 100 and having the end of an oscillating arm 101 extending therein for actuation of the frame. The arm 101 is connected by a link 102 with another oscillating arm 103, that is pivotally connected with the piston 94 for oscillation back and forth in the reciprocation of the piston. When the die head 36 shifts through 180°, it brings the hole 30, from which the finished rivet or bolt 23b was previously ejected, into position to receive the blank 23, as shown in Fig. 19, at the same time moving the previously initially upset blank 23a into position for its final upsetting operation, in which the blank recedes, as clearly appears in Fig. 20, where a carriage bolt requiring a square portion 39 on the shank under the head 38 is being produced. In the shifting of the die head 36 through 180°, the two plungers 84 revolve with it relative to a bracket 104 (see Figs. 3, 4, and 5) that is fixed to the frame 48 and has a right angle outer end portion disposed behind the end of one of the plungers 84, an adjustable back-up screw 105 being provided in this end portion adjustable toward the end of the plunger to provide a positive abutment therefor, and, accordingly, prevent receding of the pin 32 in the initial upsetting operation performed by coning punch 34. A lock nut 106 on screw 105 is tightened to fasten it securely in adjusted position. The pins or plungers 84, which are of enlarged diameter in relation to the diameter of the screw 105, may be flat on their outer ends but are shown rounded to semi-spherical form, as indicated at 107 in Figs. 5 and 6. The plungers 84 are brought alternately into coaxial alignment with screw 105 by the back and forth oscillation of the die head, and each is moved forward in the knock-out operation and remains so until brought into alignment with the coning punch 34 and back-up screw 105, at which time the insertion of a new blank into the die 31 or 31' causes pin 32 to be pushed back and it pushes plunger 84 with it into abutment with screw 105. Close accuracy in the registration of the dies 31 and 31' with the punches 34 and 37 is, of course, highly important, and it will soon appear that the plunger ball mechanism for shifting the die head 36 through 180°, once for each cycle, insures such close accuracy. The punches 34 and 37, in order to insure accurate positioning thereof are adjustable up and down on a base block 108 slidable in guides 109, a screw 110 being supported in a bracket 111 against endwise movement and threaded in a hole in the block 108. Screws 112 in the block lock it securely in the frame in adjusted position. Punches 34 and 37, which are clamped in recesses in the rotatably adjustable block 113 with the customary gib blocks, as indicated in dotted lines in Fig. 8, are adjusted rotatably with the block 113 into exact register with the dies 31 and 31', whereupon the bolts 114 are tightened to lock the same in adjusted position. Dogs 64 and 66 are pivoted and spring pressed toward operative position in the same way as dog 65, for the same reasons, and the star wheels of valves 70 and 71 may be equipped with one-way ratchet wheels for a similar reason as valve 70.

(4) The ram 35 continues its backward movement, and at the 160° position of the flywheel 44, the dog 67 operates pilot valve 72, whereby to actuate control valve 75, with which the pilot valve has pipe connections, as indicated at 115, the valve 75, in turn, delivering oil under pressure to cylinder 78 with which it is connected, as indicated at 116, to operate the piston 117 working in said cylinder and cause the cut-off knife 24 to be operated to cut off the blank 23 and transfer it to alignment with the empty hole 30 in whichever one of the dies 31 and 31' is positioned to receive it, as shown in Fig. 19. The ram 35 now moves forward, and punch 34 pushes the blank 23 into the hole 30, and as the dies come together, as shown in Figs. 17 and 20, the initial upsetting operation is performed on this newly inserted blank, and, at the same time, the final upsetting operation is performed on the other previously upset blank by punch 37. Where carriage bolts are being produced, the square shank 39 is formed as the blank recedes into the die 31 or 31', as the case may be, the bulged portion 29 furnishing the bulk of the metal necessary for the square shank portion 39 under the head 38. Here again, it is clear that dog 67 is pivoted for one way operation like dogs 64—66 for similar reasons, and valve 72 may have a one-way ratchet wheel for its star wheel for the same reason as valves 70 and 71.

(5) At the 300° position of the flywheel 44, with the ram 35 moving forward, dog 66, which as stated before, is of a pivoted, one-way type, normally urged upwardly under light spring action to operative position, is deflected by the star wheel on valve 71 and passes idly under it, so as to leave said valve undisturbed until the 60° position in the next cycle, when said dog again operates valve 71 to cause reverse operation of the control valve 74 for reverse movement of the piston 94 in cylinder 77, whereby to shift the die head 36 back through 180° to the initial position. In other words, the die head 36 is shifted only once per cycle and is in one position in alternate cycles and in the reverse position in the intermediate cycles.

(6) At the 315° position of the flywheel 44, namely, during the last 45° movement of the flywheel, with the ram 35 moving forward, dog 68, which is also pivoted and spring pressed to operative position but works in the opposite direction operates pilot valve 72 in the reverse direction for reverse operation of valve 75 and consequent reverse movement of piston 117 in cylinder 78 to return the cut-off knife 24 to its starting position to end the cycle. The reason this operation is delayed to this extent is to insure insertion of the blank far enough in the die hole 30 so that the gripping clip 41 in disengaging will not be apt to cause the blank to get cocked. The cut-off knife 24 is disposed at the far end of the blank remote from the upsetting die 34, so that the instant the blank is pushed part way into the hole 30 by the die 34 the cut-off knife 24 can be and is retracted, the upsetting die 34 thereafter finishing the insertion of the blank and, finally, upsetting the projecting end thereof as the dies close. It is common practice to provide for a variation in the timing of withdrawal of the cut-off knife in relation to die movement in headers in relation to the length of the rivets being produced. Thus, shorter rivets will necessitate much closer timing. The dog 68 is also a one-way, pivoted, spring-pressed type like the other dogs but is arranged to work in the reverse direction. In other words, this dog passes idly under the star wheel of valve 72 in the rearward movement of ram 35 but functions to operate said valve in the return movement of the ram. Here again, it is clear that valve 72 may have a one-way ratchet wheel in connection with its star wheel to prevent reverse rotation thereof.

Each of the valves 73, 74, and 75 contains a spring loaded relief valve 118, and each has a fluid return pipe 119 extending from the relief valve communicating with a common return pipe 120 that extends to the sump 62, and, in the operation of any one of the cylinders 76, 77, and 78, the piston is moved by the first input of oil, but the pump 55 continues to deliver oil in excess of what is needed and the excess oil is bypassed through the relief valve 118 to the sump 62. The same thing occurs in the event there is a jam preventing normal movement of any one of the three pistons, the same relief valve 118 associated with the obstructed or immovable piston allowing immediate bypassing of oil to the sump, so as to prevent expensive breakages and consequent long interruptions of service of the machine. Assuming, for example, that the knock-out pin 84 cannot be moved with the normal pressure exerted by piston 80, the relief valve 118 in control valve 73 opens and there is no damage to the machine by the breakage of a part or parts of the knock-out mechanism. In like manner, if the die head 36 is obstructed and fails to turn, the relief valve 118 in control valve 74 opens and there is no breakage of any part of the die head shifting mechanism. Also, if the cut-off knife 24 encounters any obstruction, the relief valve 118 in control valve 75 opens and no damage occurs. However, bearing in mind the fact that the flywheel 44 is turning rather fast and cannot be stopped instantaneously, I may provide in the right hand pipe of pipe connections 81, 93, and 116 leading to cylinders 76, 77, and 78, respectively, relief valves in lieu of the relief valves 118, and have all of these relief valves interconnected electrically with solenoid valves in the same pipes, whereby to close all of the solenoid valves whenever any one of the three relief valves opens, so that even though the machine keeps running for even a few minutes, or longer, the feeding of wire stock 25 into the machine is discontinued, the knock-out mechanism does not function, nor is the die head 36 shifted, nor the cut-off knife operated, so that nothing can be damaged and it is merely up to the operator to shut off the machine and correct the difficulty that has caused the automatic cessation of normal functioning of the machine. If desired, the switches controlling all of the electric motors for the machine can be included in the automatic shut-down operation. Another, but not as practical arrangement is to provide relief valves in the same pipes mentioned, each operating a switch to break the circuit for the machine drive motor alone, or the circuits for all of the electric motors in the machine simultaneously, all of these switches being connected in series in the circuit for the electric motor, or motors, so that build-up in pressure in any one of the cylinders 76, 77, and 78 causes stoppage of the machine. If a power operated brake is provided, arranged to be automatically applied when either of the relief valves opens to break the circuit for the main drive motor, that system would prevent serious damage to the machine. In this connection, attention is called to the brake means shown at 150 in Figs. 2 and 4, which is operable by manual depression of the foot pedal 151, to assist in stopping the machine more or less abruptly, to facilitate set-up work. This brake means 150 could also be used as a part of the power brake, or a separate power brake can be provided.

The pump 55 delivers oil under a predetermined pressure through a spring loaded check valve 121 to the valve 73 and through pipe 122 leading from valve 121 to valves 74 and 75. When either one of the relief valves 118 opens, oil is immediately bypassed to the sump 62, but also directly back to the pump 55 through the pipe connection 123 for recirculation. A pipe 124 delivers oil from the pump 55 to each of the pilot valves 70, 71 and 72, as indicated by the branches 125. When these valves are in neutral positions the incoming oil is returned through pipe 126 to the sump, but when either of these valves is shifted by the cooperating dogs 64—68, oil is delivered under pressure to the associated control valve 73, 74, or 75. Thus, when valve 70 is turned in one direction, oil is delivered therefrom through one of the pipes 79 to shift the valve piston in the body of the valve 73 to move the same in the appropriate direction for appropriate movement of piston 80, and vice versa when valve 70 is shifted in the opposite direction. In like manner, when valve 71 is shifted in one direction, oil under pressure flows through one of the pipes 92 to move the valve piston in the body of valve 74 in one direction for appropriate operation of piston 94, and vice versa when valve 71 is shifted in the opposite direction. Likewise when valve 72 is shifted in one direction, oil under pressure is delivered through one of the pipes 115 to cause movement in one direction of the valve piston in the body of valve 75, to cause appropriate movement of piston 117, and vice versa when valve 72 is shifted in the opposite direction.

In passing, I should state that while I have shown pilot valves 70—72 designed for direct hydraulic operation of the control valves 73—75, it should be understood that I may use electrical controls instead and substitute solenoid operated valves for valves 73—75. Thus, when, for example, dog operation of a switch unit at 70 occurs the electrical solenoid for valve 73 is energized and causes operation of said valve. Valves like or closely similar to those illustrated at 70, 71, 72, 73, 74 and 75 are so common in hydraulic control systems for various purposes that it was not considered to be necessary to illustrate all of the details thereof.

In conclusion, attention is called again to Figs. 11-13 and related Figs. 5 and 6, for a better understanding of the important feature of the ball operation of the oscillatably shiftable die-head 36. It was mentioned before that the shifting of the die head on the frame instead of on the ram enables running at higher speeds without too much vibration. The die-head 36 is supported on a spindle 136 that is supported in radial and end thrust bearings 137 in the frame and has the knock-out plungers 84 slidable in parallel bores 138 provided therein. Oscillatory movement through 180° is transmitted to the head 36 through the plungers 84 by a drum 139, which has parallel bearings 140 mounted thereon, in which the reduced outer end portions of the plungers 84 are slidably mounted. The drum 139 has two spaced raceways 141 of semi-circular shape in cross-section which register with similar raceways 142 provided in the bearing 143 that is mounted on frame 48 in which drum 139 is rotatably received. The raceway 142 in which balls 97 operate extends through a little more than 180° as shown in Fig. 11, and the raceway 142 in which the other set of balls 98 operate extends through a little more than 180° on the diametrically opposite side of the bearing 143, as shown in Fig. 13. There are radially projecting lugs 144 on the drum 139 in diametrically opposed relation, extending into raceways 142 and serving both as abutments for the balls 97 and 98 and as abutments for engagement with stop screws 145 adjustably mounted in the bearing 143 at the upper ends of the raceways 142, the two sets of balls 97 and 98 being both movable into said raceways at their lower ends from the tangentially extending bores 146 in which the plungers 95 and 96 operate and moving in a clockwise or counterclockwise direction depending upon whether the frame 99 carrying the plungers 95 and 96 is moved in one direction or the other. The frame 99 is positively reciprocated by the hydraulically operated piston 94, but is held resiliently in either limit position by virtue of the fact that the oscillatable arm 101, which transmits movement from the piston 94 to frame 99, engages opposed plungers 147 slidable in bores in the frame and held by coiled compression springs 148 in tight engagement with the opposite sides of the arm 101. Thus, the right hand spring 148 in Fig. 11 is the one active in that case to hold the drum 139 spring pressed against the stop screw 145 at the limit of counterclockwise shifting of the die head 36. Screws 149 threaded in the bores in the frame 99 can be adjusted to increase or decrease the spring pressure and held in adjusted position by the lock nuts shown. Screws 145 are accurately adjusted to align dies 31 and 31' with punches 34 and 37 at both extremes of 180° movement of the die head 36 with drum 139, and lock nuts on these screws are tightened to hold the same in adjusted position. The use of balls 97 and 98 means elimination of all play in the die head shifting mechanism and makes for easy and quiet operation with minimum wear, while permitting general speeding up of the operation of the machine for maximum production.

In conclusion, while I have illustrated and fully described my invention as applied to a two-stroke header, it should be obvious that if two wire feed and cut-off mechanisms were provided, one on each side of the die head 36, instead of the one herein shown at 50—51 and 24, and both punches were of the form of finishing punch 37, a single-blow machine of practical design is obtained in which two rivets or bolts are produced per cycle, using a stationary die head. Also, it is easy to see that the present two-blow machine, producing one bolt or rivet per cycle, can be made to produce any multiple of that number per cycle, if the machine is enlarged and the same multiple of coning punches and the same multiple of finishing punches are provided and the die head is equipped with as many dies on each side of center as there are coning and finishing punches, whereby to operate in the manner of the machine herein disclosed. The blanks for such a machine can be supplied from above or below the coning punches, one wire feed and one cut-off knife being provided per coning punch, or a separate blank cutter can be provided and the blanks fed to transfer means serving the various coning punches so that they insert the blanks in the associated dies in the coning operation, similarly as above outlined in the description of the machine herein illustrated.

It is believed the foregoing description conveys a good understanding of the objects and advantages of my invention. The appended claim has been drawn to cover all legitimate modifications and adaptations.

I claim:

A cold forging machine for forming heads on bolts and the like comprising, in combination, a frame, a ram reciprocable thereon, a coning punch and a finishing punch carried by the ram in spaced relation, a die head rotatably mounted on the frame carrying two dies in the same spaced relation as the punches and arranged to be coaxially aligned therewith in reversed order in each half revolution of the die head, a cut-off die independent of the die head, a combined cut-off knife and blank gripping unit reciprocable relative to the cut-off die radially with respect to the rotary die head and operated in timed relation to the rotation of said head to cut blanks and feed them one at a time to whichever die is disposed on that side of the head nearer the cut-off die, means for turning the die head a half revolution per cycle so that in one cycle a blank disposed in one die is coned by the coning punch and the same blank in the next cycle is finished by the finishing punch, pins slidable endwise in the dies behind the blanks and arranged to be revolved with the dies, means to support the pins against backing up in the upsetting operations comprising a fixed back-up abutment behind the die head coaxially aligned with the coning punch arranged to be engaged by the outer end of whichever pin is disposed in operative relationship to said coning punch, and knock-out means behind the die head and aligned with the finishing punch for engagement after the finishing operation with the outer end of whichever pin is aligned with the finishing punch to move the pins forward to eject the finished blanks, said pins being slidable rearwardly to back up position with the blanks in the insertion thereof.

ROBERT R. AKEY.

References Cited in the file of this patent

UNITED STATES PATENTS

| Number | Name | Date |
|---|---|---|
| 809,520 | Meyer | Jan. 9, 1906 |
| 1,024,046 | Weeks | Apr. 23, 1912 |
| 1,300,240 | Blakeslee | Apr. 15, 1919 |
| 2,038,543 | Clouse | Apr. 28, 1936 |
| 2,104,297 | Friedman | Jan. 4, 1938 |
| 2,128,152 | MacMillin | Aug. 23, 1938 |
| 2,155,920 | Alberts | Apr. 25, 1939 |
| 2,204,043 | Maclagan | Jan. 11, 1940 |
| 2,227,810 | Mitchell | Jan. 7, 1941 |
| 2,236,221 | Shwayder | Mar. 25, 1941 |
| 2,303,662 | Schmartz et al. | Dec. 1, 1942 |
| 2,364,716 | Huebner | Dec. 12, 1944 |

FOREIGN PATENTS

| Number | Country | Date |
|---|---|---|
| 8,753 | Great Britain | Apr. 11, 1911 |
| 56,291 | Austria | Nov. 11, 1912 |